United States Patent
Wilson, Sr.

(10) Patent No.: US 11,362,501 B2
(45) Date of Patent: Jun. 14, 2022

(54) INSULATOR INSERT FOR WEATHERHEAD AND METHODS OF INSTALLING

(71) Applicant: Laurin T. Wilson, Sr., Georgetown, SC (US)

(72) Inventor: Laurin T. Wilson, Sr., Georgetown, SC (US)

( * ) Notice: Subject to any disclaimer, the term of this patent is extended or adjusted under 35 U.S.C. 154(b) by 0 days.

(21) Appl. No.: 16/868,604

(22) Filed: May 7, 2020

(65) Prior Publication Data

US 2020/0366075 A1    Nov. 19, 2020

Related U.S. Application Data

(60) Provisional application No. 62/847,495, filed on May 14, 2019.

(51) Int. Cl.
*H02G 3/22* (2006.01)
*H02G 3/30* (2006.01)
*H02G 3/08* (2006.01)

(52) U.S. Cl.
CPC ............... *H02G 3/24* (2013.01); *H02G 3/088* (2013.01); *H02G 3/22* (2013.01)

(58) Field of Classification Search
CPC ............ H02G 3/24; H02G 3/088; H02G 3/22; H02G 3/0418; H02G 3/06; H02G 3/02; H02G 3/0437; H02G 3/04; H02G 3/26; H01B 17/583; H01B 17/66
USPC ........ 174/40 R, 163 R, 79, 81, 93, 72 R, 80, 174/82; 385/134, 135; 285/45, 179; 248/56, 49, 68.1
See application file for complete search history.

(56) References Cited

U.S. PATENT DOCUMENTS

| | | | |
|---|---|---|---|
| 2,065,297 A | | 12/1936 | Wiechers |
| 2,148,059 A | * | 2/1939 | Dann ................. H02G 3/22 174/81 |
| 2,404,152 A | | 7/1946 | Weller |
| 2,423,350 A | | 7/1947 | Stockton |
| 2,648,721 A | | 8/1953 | Wayman |
| 2,739,999 A | * | 3/1956 | Gill ..................... H02G 3/22 174/81 |
| 2,865,981 A | | 12/1958 | Budnick |
| 2,908,745 A | | 10/1959 | Appleton |
| 2,926,212 A | | 2/1960 | Appleton |

(Continued)

OTHER PUBLICATIONS

The Home Depot, 2 in. Service Entrance (SE) Cap, Aug. 13, 2018, https://www.homedepot.com/p/2-in-Service-Entrance-SE-Cap-58020/100183949.

(Continued)

*Primary Examiner* — Angel R Estrada
(74) *Attorney, Agent, or Firm* — L. Lawton Rogers, III

(57) ABSTRACT

An improved weatherhead and insulator, and methods for using and installing same, for improved insertion and installation of wiring/cabling to new or existing structures. The weatherhead includes a replaceable disc insulator that may be initially installed or replaced as part of a new weatherhead, or replaced in an installed weatherhead if damaged without passing the end of the service through the insulator. The open spaces through which the service passes are accessible from the top of the insulator. Where the cap is metallic, additional insulation may be inserted at the top of the insulator. The insulator is configured to prevent relative movement between the insulator and collar during installation.

11 Claims, 10 Drawing Sheets

(56) References Cited

U.S. PATENT DOCUMENTS

| | | | | |
|---|---|---|---|---|
| 2,993,084 | A | 7/1961 | Curtiss | |
| 3,287,488 | A | 11/1966 | Piasecki et al. | |
| 3,328,513 | A * | 6/1967 | Goldsobel | H02G 3/22 174/81 |
| 3,337,689 | A | 8/1967 | Rudolf et al. | |
| 3,389,212 | A * | 6/1968 | Dearle | H02G 3/22 174/81 |
| 4,767,086 | A * | 8/1988 | Blomqvist | F16L 5/14 248/56 |
| 4,876,414 | A * | 10/1989 | Johnson | H02G 3/22 174/81 |
| 4,889,298 | A * | 12/1989 | Hauff | F16L 5/08 248/56 |
| 4,919,372 | A * | 4/1990 | Twist | F16L 5/14 248/56 |
| D324,853 | S * | 3/1992 | Johnson | D13/154 |
| 5,783,776 | A * | 7/1998 | Birmingham | F16L 5/08 174/657 |
| 6,133,528 | A * | 10/2000 | Henriott | A47B 91/024 174/652 |
| 6,867,371 | B2 * | 3/2005 | Daoud | G02B 6/4428 174/652 |
| 8,348,204 | B2 * | 1/2013 | Kataoka | B61D 49/00 248/68.1 |
| 8,963,010 | B2 * | 2/2015 | Sprenger | H02G 3/083 174/152 G |
| 9,024,195 | B2 * | 5/2015 | Clothier | H02G 3/06 174/152 G |
| 10,574,048 | B2 * | 2/2020 | Nowastowski-Stock | H02G 3/22 |
| 11,146,048 | B2 * | 10/2021 | Wilson, Sr. | H02G 3/0418 |
| 2009/0242230 | A1 * | 10/2009 | Hebert | H02G 3/14 174/67 |

OTHER PUBLICATIONS terrylove.com, Replace weatherhead without turning off service?, May 23, 2008, https://terrylove.com/forums/index.php?threads/replace-weatherhead-without-turning-off-service.210.

Garvin, Split Ground Bushing, Zinc Die Cast, 4 in, Aug. 13, 2018, https://www.garvinindustries.com/fittings/rigid-conduit-fittings/split-grounding-bushings/sgb400.

* cited by examiner

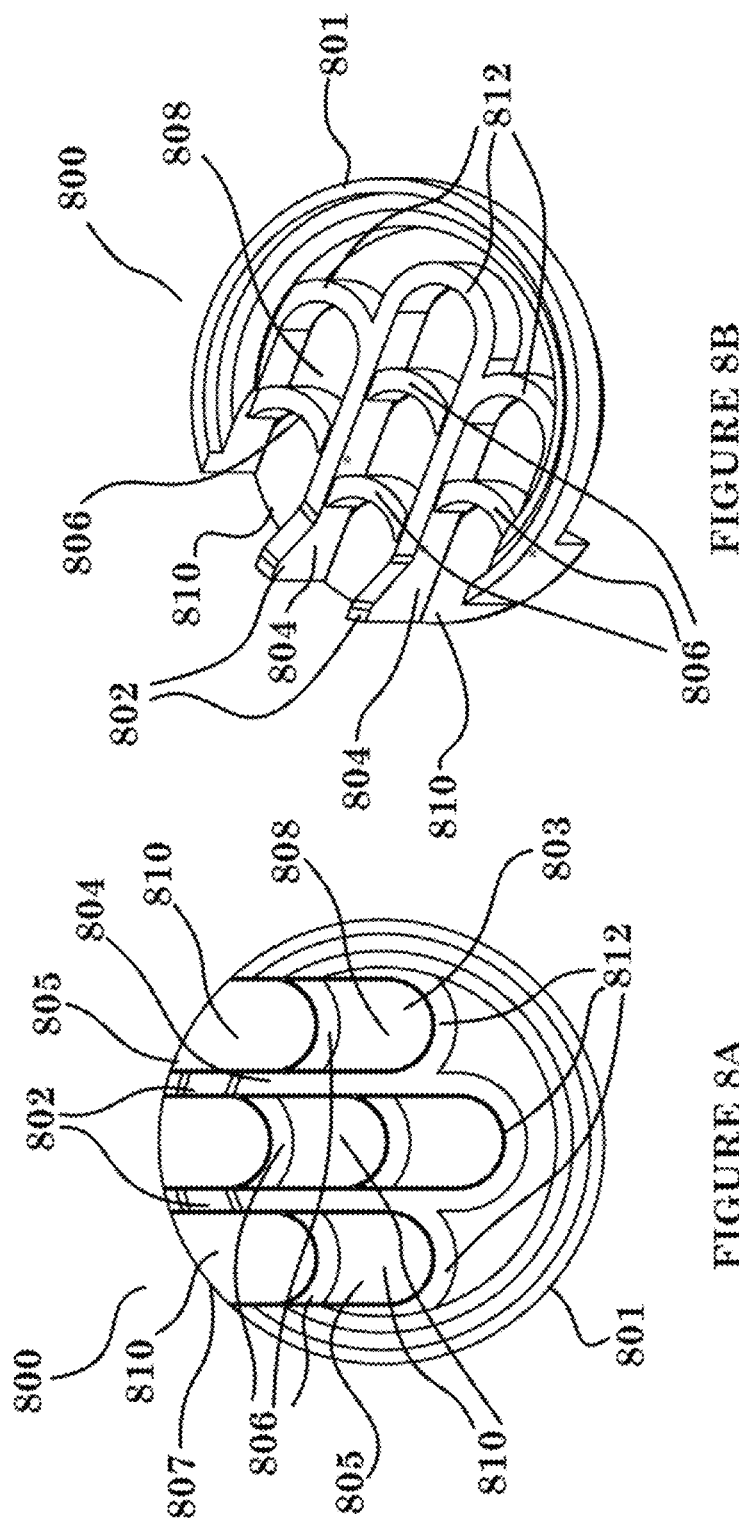

900 — Remove existing weather head cap

902 —

904 — Inspect existing insulator

906 — If insulator is damaged, break away/remove existing insulator from around wiring/cabling/lines 908 — Remove existing weather head base and support arms from around conduit and wiring/cabling/lines 910 — Install new weather head collar around conduit and wiring/cabling/lines 912 — Install current disclosure insulator into weather head support arms 914 — Remove frangible sections from insulator body to form openings 916 — Place wiring/cabling/lines in openings formed in insulator 918 — Install insulator upper portion into insulator lower portion 920 — Reinstall existing weather head cap

FIGURE 9

INSULATOR INSERT FOR WEATHERHEAD AND METHODS OF INSTALLING

BACKGROUND OF THE INVENTION

1) Field of the Invention

The present invention relates to an improved insulator insert for improved insertion and insulation of wiring/cabling/lines to new or existing structures employing a multi-part construction and an anti-rotation lip to secure the insulator insert during use and methods of using same.

2) Description of Related Art

A weatherhead—also called a weather cap, service head, service entrance cap, or gooseneck (slang)—is a weatherproof service drop entry point where overhead power, data, or telephone wires enter a building, or where wires transition between overhead and underground cables. At a building, the wires enter a conduit (e.g., a protective metal pipe) and the weatherhead is a waterproof cap on the end of the conduit that allows the wires to enter without letting in water, insects, debris, etc.

The "weatherhead" or "service entrance head" (i.e., the entire device attached to the conduit through which the electrical "service" enters the conduit) is sometimes referred to as a "weathercap" while "cap" is also used for the participation hood that overlies the device. This cap is shaped like a hood, with the service facing down at an angle of approximately 45°, to shield the conduit from participation and may employ a gasket for a tight seal against the service passing through the weatherhead. Before the wires of the service enter the weatherhead, a drip loop is left in the overhead wires, which permits rain water that collects on the wires to drip off before reaching the weatherhead. Weatherheads are required by electrical codes and building codes. They are also used on utility poles where overhead power and communication lines enter a conduit to pass underground, and also with signal light poles, etc.

As discussed infra, the "service" is the entirety of the wires (or groups thereof) passing through the weatherhead under the "cap". The removable insulating structure that supports and separates the wires (or groups thereof) of the service as it enters the weatherhead is sometimes referenced as a "wire separator" or "wire support" and, because of its lack of electrical conductivity, simply as an "insulator".

Multiple prior designs for weather heads or service entrance caps exist. For example, U.S. Pat. No. 3,287,488 discloses service cable entrance fittings adapted for use in connecting a service entrance cable to outside electric power lines. More particularly, the invention resides in a hooded, non-metallic service cable entrance fitting, in different sizes, which is adapted to be secured or attached. to a building structure generally for the sole reception and/or connection thereto of non-metallic, sheathed electric service cable of corresponding size or capacity. See FIGS. 1A and 1B, which shows multiple views of the prior design.

U.S. Pat. No. 2,423,350 discloses a weather-proof connector and insulator for outdoor use, as on the wall of a building, to connect the leads from power lines to inside service entrance lines in a quicker and easier manner than is possible with present-day connectors, and with all connections adequately protected against the weather while at the same time being readily accessible for repair or renewal as required. (Abstract.)

U.S. Pat. No. 3,337,689 relates to a service entrance head for mounting on one end of electric wire conduiting, and includes a base or frame provided with a socket portion that receives the end of the conduiting and a forwardly disposed insulator supporting portion that receives a conventional insulator, a cover or hood that closes the head, and a clamping strap for clamping the head body or frame to the conduiting. The frame insulator support portion is in the form of a pair of arcuate arms that define a semi-circular shoulder on which the insulator is mounted, with the arms at their tips being formed with opposed protuberances that are proportioned to make a snap fitting engagement with the insulator when it is applied to the shoulder. The head cover or hood is hinged to the frame for swinging movement between open and closed positions, and the cover and frame include cooperating lugs to hold the insulator in place when the cover is closed, with the cover being held in its closed position by a friction type catch. (Abstract.)

U.S. Pat. No. 2,065,297 provides flexible conduit connecters, and is particularly concerned with connecters of the elbow type for connecting the flexible conduit to an outlet box or switch box or a housing, such as a transformer housing. In the devices of the prior art, the conduit connecters are customarily provided with a threaded member which projects through the aperture in the box, and a nut is mounted on the inside of the box to clamp the connecter to the box. Where such connecters are used on transformer housings, such as those for ignition transformers, the housing is customarily filled with a compound in which the nut is embedded, and if the elbow is secured in one position and it is discovered that the elbow should go off in a different direction, it is impossible to turn the elbow without loosening this connection to the box because the nut is embedded in the compound. (Abstract.)

Other prior designs include U.S. Pat. Nos. 2,648,721, 2,865,981, 2,993,084, 2,908,745, 2,926,212, and 2,404,152.

A major failing of the prior designs is the requirement that, when either the entire entrance or service weatherhead or a broken insulator needs to be replaced, the service or wiring running under the cap and through the insulator be severed or disconnected to remove the existing entrance head and/or install a new one. Severing or disconnecting the wiring then requires either running new wiring through the replacement/new entrance head or pulling the original back through. In a modern urban setting, a service entrance cap installation for previously installed wiring/lines may require not just the effort of cutting/disconnecting and rewiring, but also multiple visits from an electrical utility, a cable provider, as well as a telephone provider to reinstall the severed/disconnected wiring/lines.

Accordingly, it is an object of the present invention to provide an improved weatherhead and insulator insert for improved insertion and insulation of wring/cabling to new and or existing structures, where the insulator is a removable disc employing an anti-rotation lip to secure the insulator during installation and use, and methods of using same.

BRIEF SUMMARY OF PREFERRED EMBODIMENTS

The above objectives are accomplished according to the present invention by providing in a first embodiment, an improved insulator insert. The insulator insert may include an insulator body that has an upper insulator portion and a lower insulator portion that are removably joined to one another. The insulator body upper portion does not move with respect to insulator body lower portion when joined.

However, the two may move as a single unit when joined. The insulator body upper portion does not move with respect to insulator body lower portion when joined. The insulator may also include at least one support arm formed on the insulator support upper portion that engages with an interior wall of the insulator support lower portion, at least a first frangible surface and a second frangible surface defined within an upper surface of the insulator support lower portion, and at least one frangible section in each of the first frangible surface and the second frangible surface covering an opening defined within the first frangible surface and the second frangible surface, removal of at least one frangible section reveals an opening defined in the at least one first frangible surface or second frangible surface. Further, the upper portion moves in unison with the lower portion when joined. Additionally, only a single frangible section may be removed from the insulator.

Further, the insulator body may be substantially circular in shape. Still yet, the insulator may include a third frangible surface. Yet again, either the first frangible surface or the second frangible may define at least two frangible sections via at least one frangible seam. Still further, the insulator may include an insulator lower portion engagement face. Yet again, the insulator may include at least one wire support ridge. Still yet further, the insulator may include at least one removable wire support.

In a further embodiment, the current disclosure provides a method for installing an improved insulator insert. The method may include exposing a previous insulator and wiring secured by the previous insulator, removing the previous insulator from around the wiring, removing at least one frangible section from an insulator body of a new insulator to form at least one opening in the insulator body, placing at least one wire in the opening formed in the insulator body, securing the at least one wire within the new insulator by joining an upper insulator section to a lower insulator section to secure the wire within the opening.

Further, the method may include removing an existing weather head cap to reveal the previous insulator. Still, the method may include removing a weather head base from the conduit. Yet again, the method may include installing a new weather head collar around the conduit. Yet further, the method may include placing the new insulator into weather head support arms formed by the weather head collar. Again yet, the method may include installing a new weather head cap or the existing weather head cap over the new insulator. Furthermore, the method may include wherein the insulator upper portion does not move with respect to the insulator lower portion when joined. Furthermore, the method may include wherein the insulator upper portion does not move with respect to the insulator lower portion when joined. Again, the method may include joining an upper insulator section to a lower insulator section occurs with at least one support arm formed on the insulator upper portion engaging with an interior wall of the insulator lower portion. Still further, the method may include removing at least one frangible section from at least a first frangible surface and a second frangible surface defined within an upper surface of the lower insulator section to reveal at least one opening in the first frangible surface and the second frangible surface. Yet still again, the method may include removing at least one frangible section from a third frangible surface defined in the upper surface of the lower insulator section. Further, the method may include removing a frangible section reveals the opening as well as at least one removable wire support. Further, the method may include removing a frangible section reveals the opening as well as at least one removable wire support. Further again, the method may include removing at least one removable wire support from the new insulator. Additionally, one does not need to remove more frangible surfaces than necessary, such as removing only a single frangible surface to accommodate a single wire as opposed to removing two or more frangible surfaces when only one opening needs to be defined in the insulator.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 8A and 8B show an alternative embodiment of an insulator insert of the current disclosure with wiring supports and stand-off ridges.

FIG. 9 shows a method of use for an improved insulator of the current disclosure.

Figure 1A:
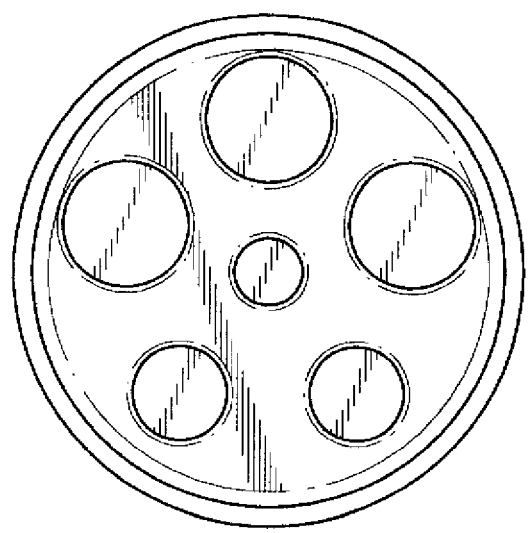
FIG. 1A shows a prior art device insulator.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure provides an improved insulator for use with service entrance caps. Service entrance caps allow wiring, cabling, etc., to enter into a home or business via an egress formed in the structure and covered/protected by the service entrance cap. During a rewiring or repair event, the prior installed entrance cap proves to be cumbersome for installers adding or replacing wiring or cabling.

Figure 1B:
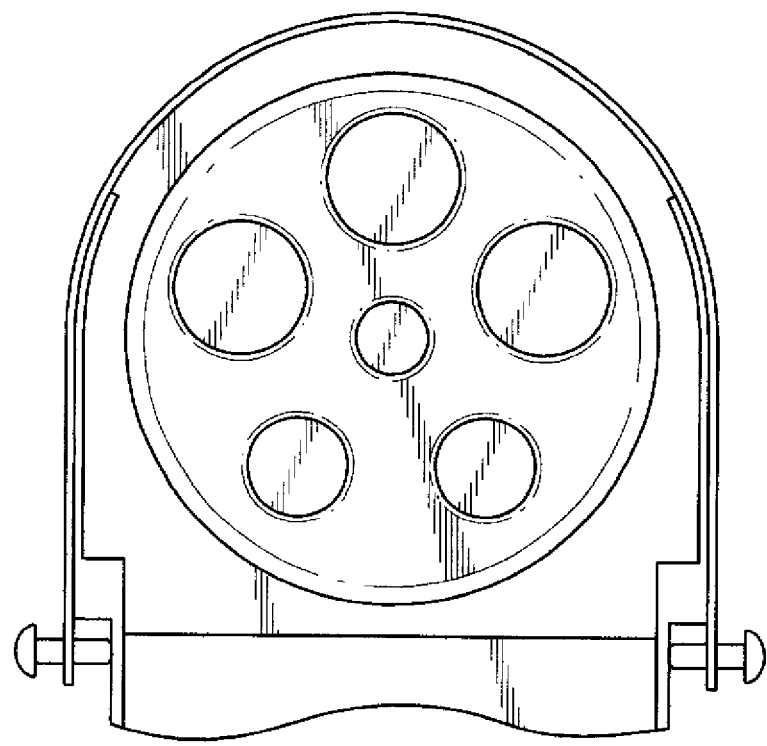
FIG. 1B shows a prior art device insulator in place in a service entrance cap.

The new insulator insert of the current disclosure will allow the installer to lay the wires in the insulator insert, rather than having to force the wiring/cabling longitudinally through static opens, see FIGS. 1A and 1B, which shows prior art devices with frangible sections that, when removed, only form a hole for inserting wiring/cabling. Before the current disclosure's innovation, installers had to insert the end of the wires through the holes, which for long wires proved a cumbersome, time intensive effort, especially if the wiring or cabling was kinked or otherwise not straight. In addition to easier insertion of wiring/cabling, the new insulator insert for a service entrance cap will insulate the wire from metal contact with the cap and will lock the insert in place via an anti-rotation lip that will prevent the insulate insert from rotating inside a bracket in the service cap entrance. The new insert will fit all existing service cap entrances/heads of this general shape and style.

Figure 2:
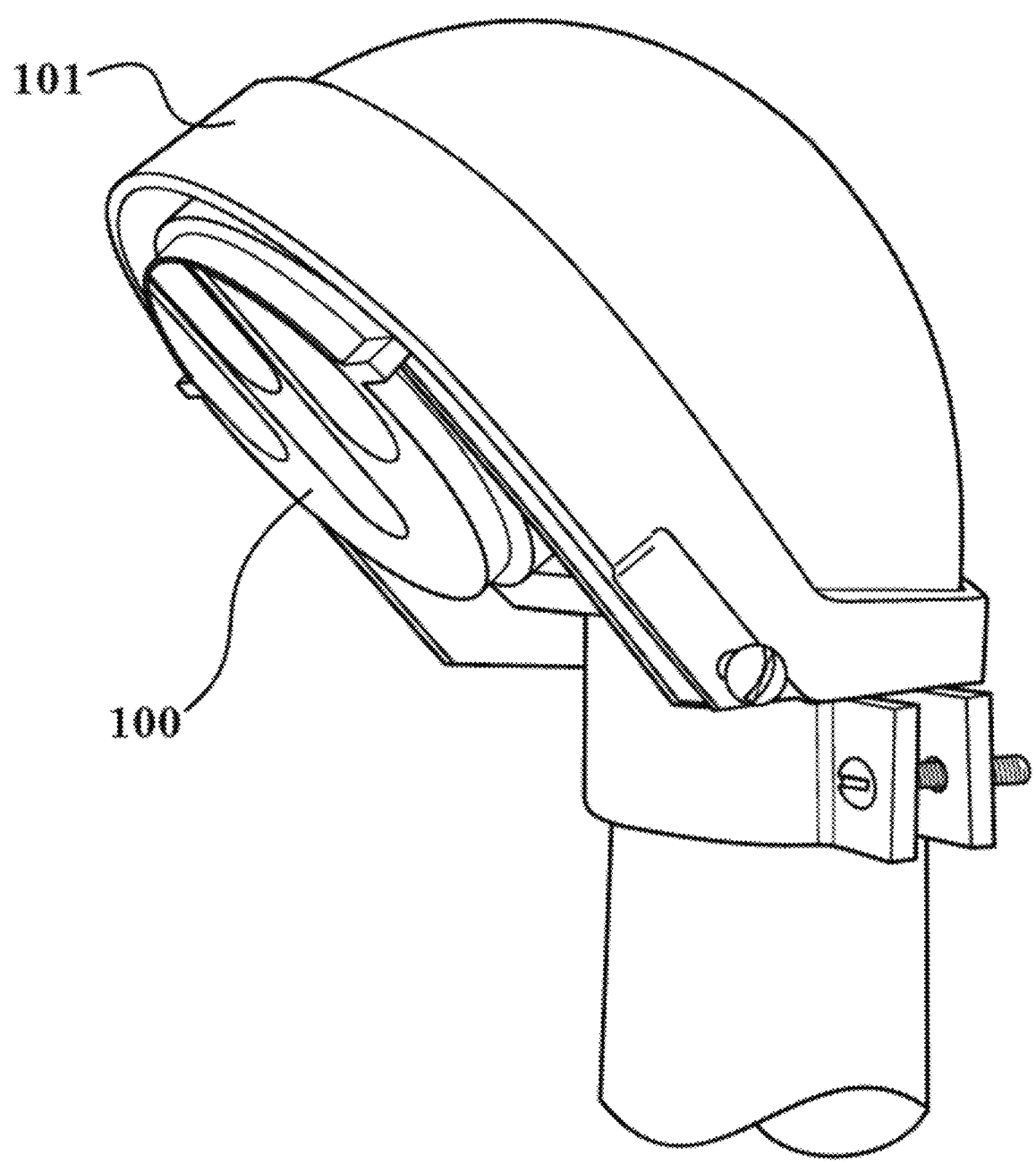
FIG. 2 shows an improved insulator of the current disclosure.
Figure 3:
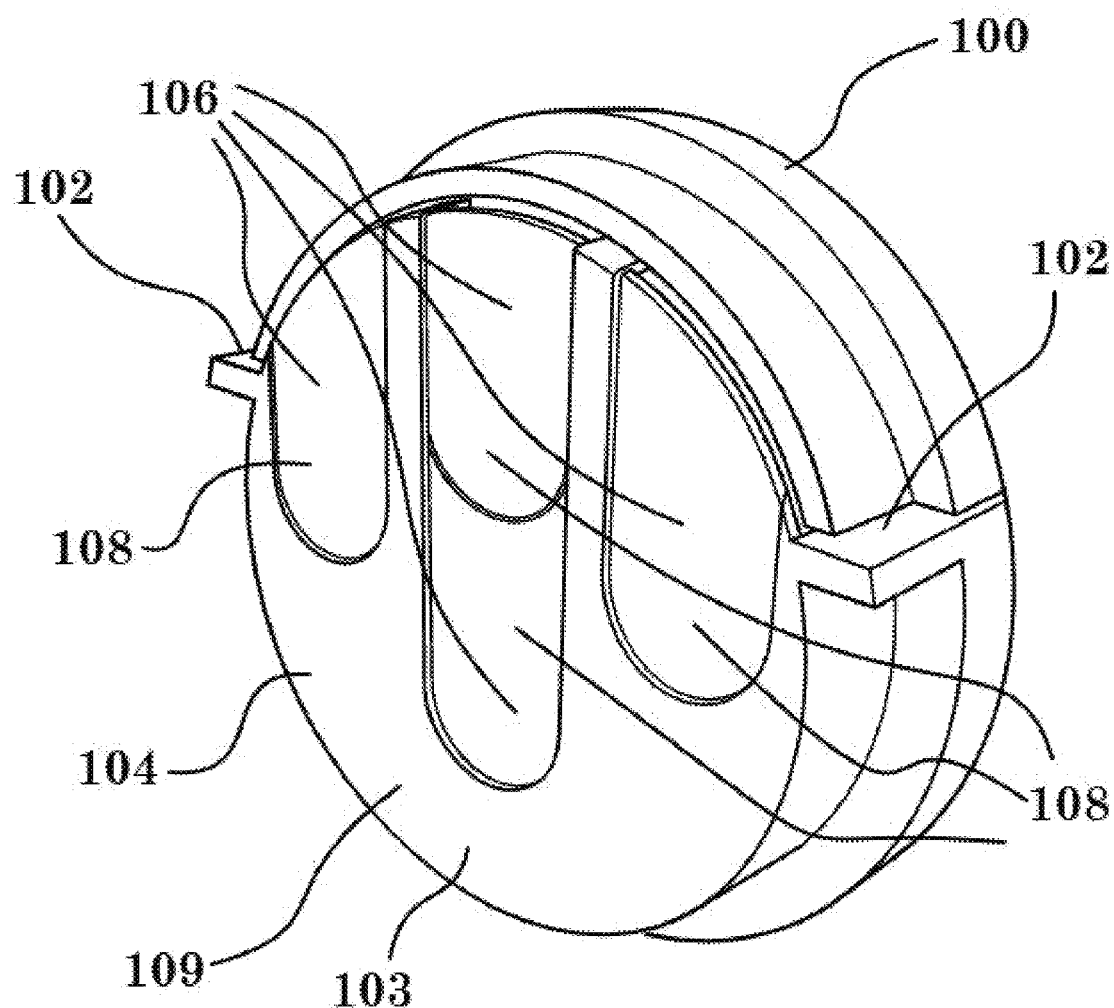
FIG. 3 shows a front view of an insulator insert of the current disclosure.

FIG. 2 shows an insulator insert 100 of the current disclosure installed with a service entrance cap/weather head cap 101. FIG. 3 shows a front view of insulator insert 100, which includes anti-rotation lip 102 and wiring support frame 104 defined in insulator body 103. Anti-rotation lip 102 is designed to increase the circumference of wiring support frame 104 so that when installed, anti-rotation lip 102 locks insulator insert 100 into place within a weather head support arms 1002, see FIG. 10, by extending over and beyond the existing circumference of wiring support frame 104.

Insulator insert 100 serves to cover wiring/cabling, not shown, that lays in wiring openings 106 (defined when frangible sections 108 are removed) as well as insulates any such wiring from any metal services of weather head cap 101. Insulator insert 100 may be made from Multi-piece separator 804 may be made from polyethylene, cross-linked polyethylene (either through electron beam processing or chemical crosslinking), rigid laminate, varnish, resin, PVC, Kapton, Cresyl Pthalate, DEHP, rubber-like polymers, oil impregnated paper, Teflon, silicone, or modified ethylene tetrafluoroethylene (ETFE), Bakelite®, compressed inorganic powder, glass, plastic, rubber, mica, perfluoroalkoxy, etc., as known to those of skill in the art. Wiring support frame 104 may define wiring openings 106, which may be any preferred shape as long as the uppermost portion of opening 106 are left open and unobstructed when frangible sections 108 are removed from wiring support frame 104. Remaining section 109 is not frangible and serves to support wiring/cabling, etc., inserted through openings 106 and secure same within insulator insert 100. While frangible sections 108 are shown as a flat rounded column, they are not so limited in shape and may be various shapes, including both two dimensional and three dimensional construction, such as, elongated cubes or elongated blocks, flat polygons, three dimensional polygons, hour-glass, angular, circular, etc., all of which may be two dimensional or three dimensional. Further, frangible sections 108 do not have to be the same shape and various shaped frangible sections 108 may be included in the same insulator.

Figure 4:
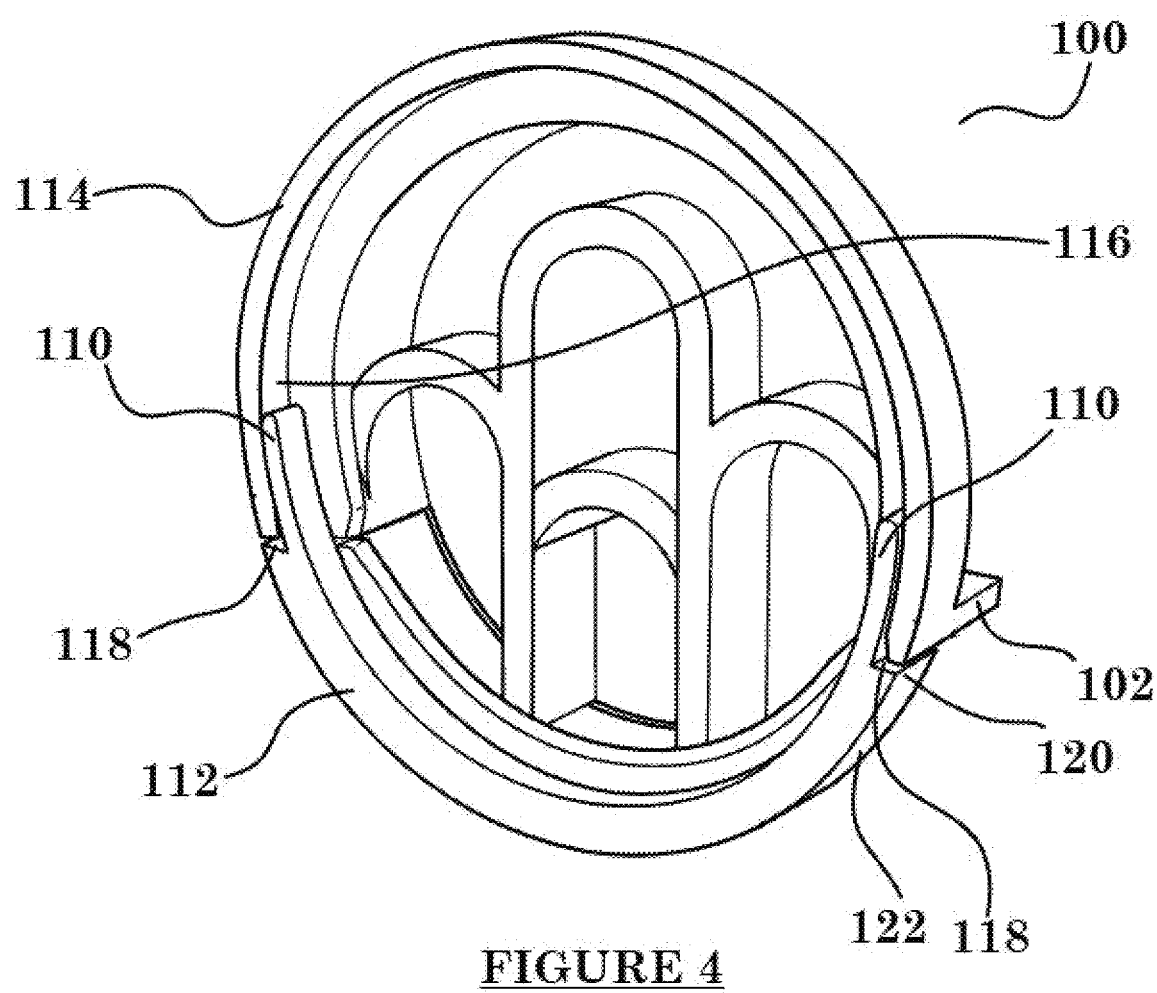
FIG. 4 shows a rear view of an improved insulator insert of the current disclosure.

FIG. 4 shows a rear view of an improved insulator insert 100 of the current disclosure. Here, one may see support arms 110, which serve to secure insulator upper portion 112 to insulator lower portion 114 via frictional engagement with insulator lower portion interior wall 116. Anti-rotation lip 102 engages with insulator upper portion ledge 118, formed as a protrusion 120 from insulator upper portion outer wall 122.

Figure 5:
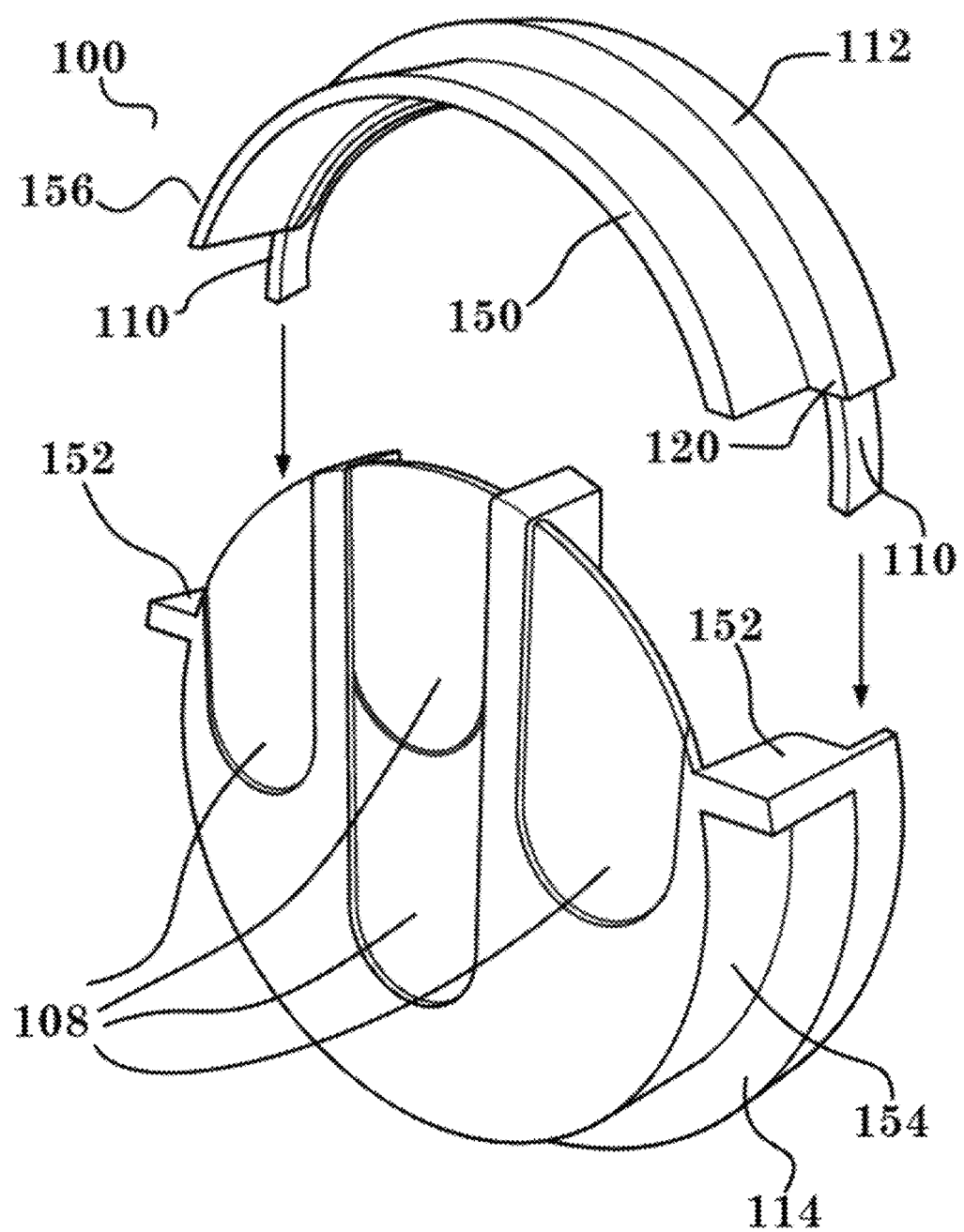
FIG. 5 shows a front view of an improved insulator insert of the current disclosure with the insulator upper portion separated from the insulator lower portion.

FIG. 5 shows a front view of improved insulator insert 100 with insulator upper portion 112 separated from insulator lower portion 114. As FIG. 5 shows support arms 110 are inserted under insulator lower portion to frictionally engage with insulator lower portion interior wall 116, not shown. Further, insulator upper portion ring wall 150 engages with insulator lower portion engagement face 152 to further keep upper insulator portion 112 locked into place with respect to insulator lower portion 114. Further, upper portion ring wall 150 and lower portion ring wall 154 substantially or completely form a ring around exterior 156 of insulator insert 100. This, in conjunction with frangible sections 108 and upper portion ring wall 150, reduces and/or prevents water, insects, vermin, debris, etc., from gaining access to a building via the service entrance cap and/or insulator as well as acts as an additional insulator to the wiring/cabling to prevent same from coming into contact with metal, such as a metal weatherhead cap, sidewall, etc.

Figure 6:
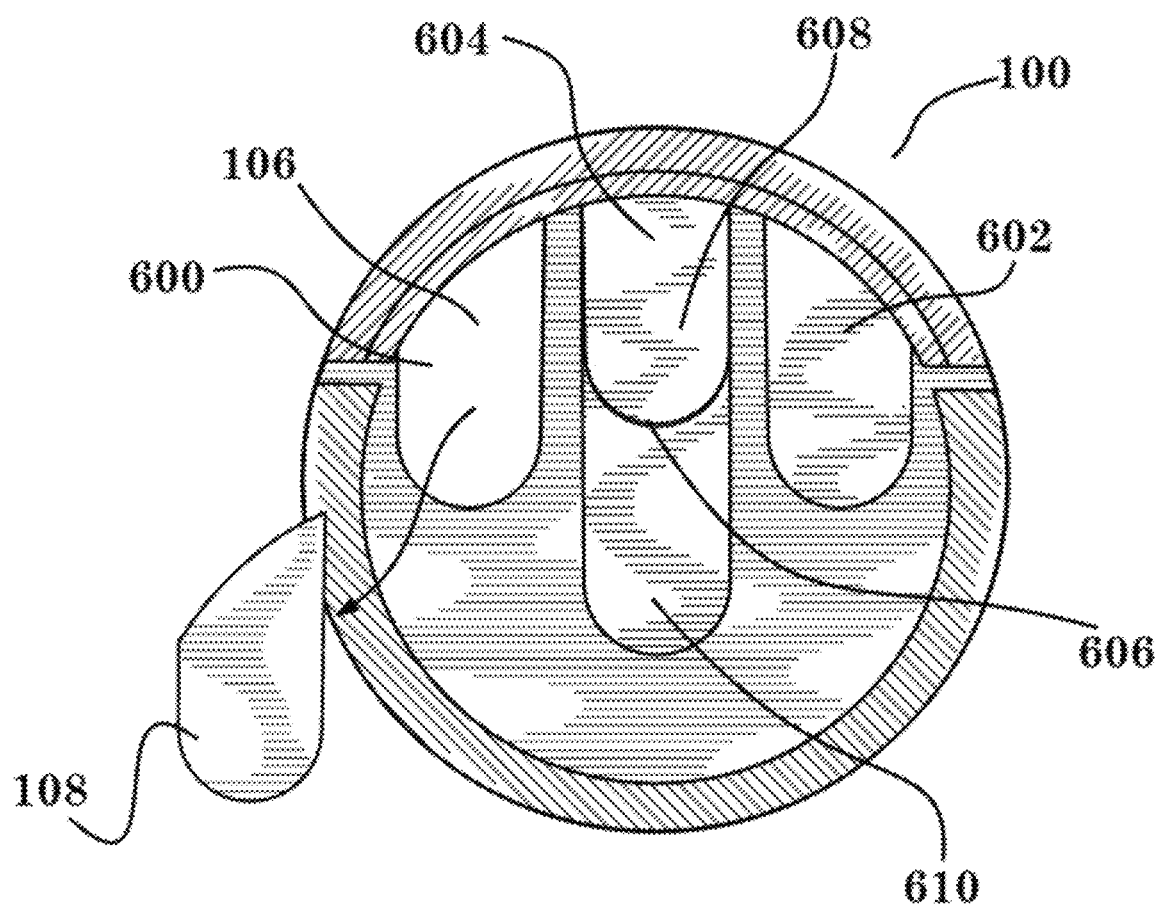
FIG. 6 shows an improved insulator insert of the current disclosure with one frangible section removed to define an opening in the insulator body.
Figure 7:
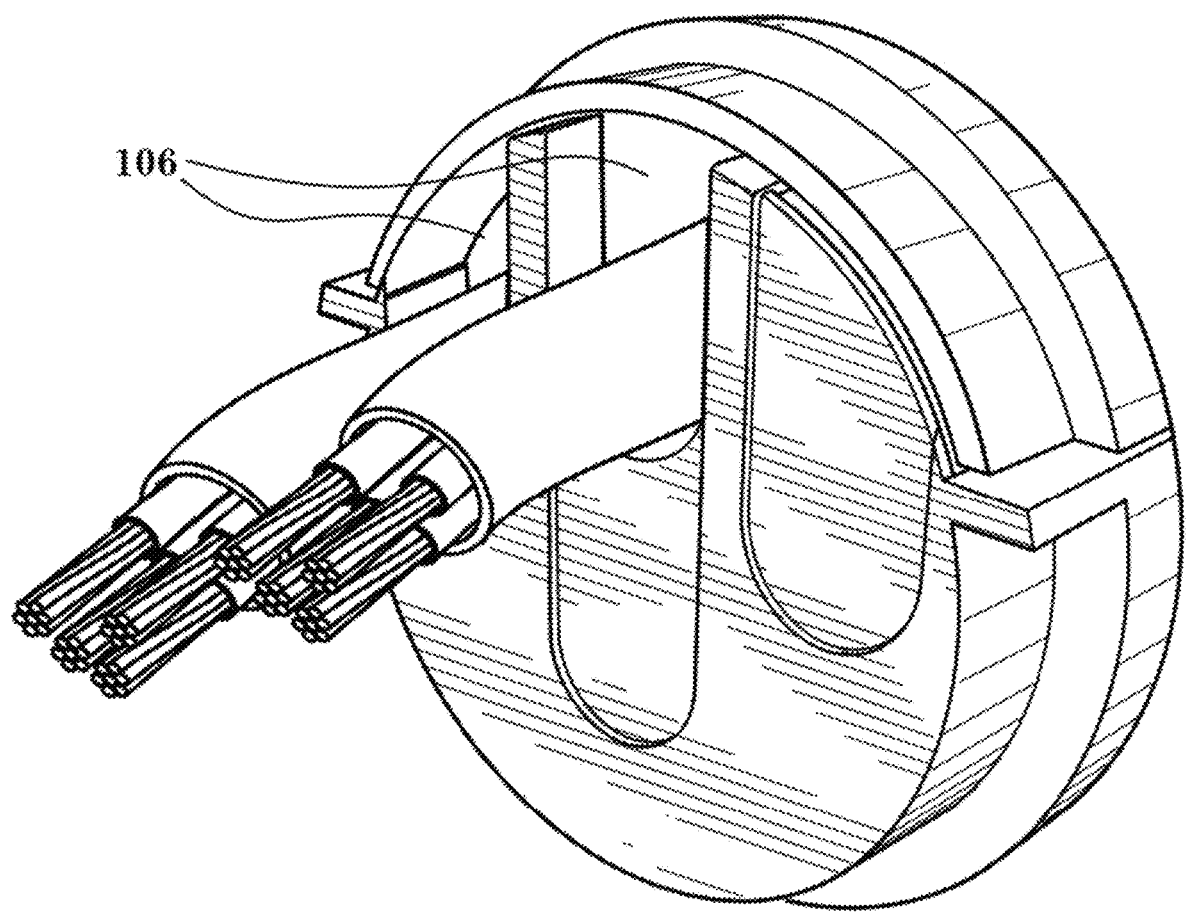
FIG. 7 shows one embodiment of the current invention with wiring/cabling extending through openings formed in the insulator body.

FIG. 6 shows improved insulator insert 100 with one frangible section 108 removed to define opening 106. While first frangible section 600 is shown possessing one opening 106 and one frangible portion 108, the current disclosure should not be considered so limited and more openings/frangible portions are considered disclosed for first frangible surface 600, second frangible surface 602 and third frangible surface 604. Indeed, frangible seam 606 may be employed so that any frangible surface is divided into two, three, four, or more frangible sections that may be separated from one another via frangible seam 606 to provide openings of various dimensions. The frangible portions of the current disclosure may be made through forming weakened seams, fragile sections, removable sections, or forming broken line perforations in a variety of shapes and styles to allow for forming various shaped and sized sections to be remove from insulator insert 100. Further, while frangible section 108 is shown as roughly columnar, any size/shape frangible section 108 and opening 106 may be defined by varying the shape, width, depth, and contour of the frangible section and opening 106. Moreover, while the frangible sections 108 are shown roughly similar in appearance, all three frangible surfaces may have different shaped frangible sections 108 and openings 106, such as first frangible surface 600 defining three rectangular openings 106 covered by rectangular sections 106, meanwhile frangible section 604 may comprise four circular frangible sections 108 and openings 106 with third frangible surface 602 defining triangular frangible sections 108 and openings 106. FIG. 7 shows one embodiment of the current invention with wiring/cabling extending through openings 106. In one instance, frangible sections 108 may be formed so that they can be removed with or without removing removable wire supports 806, see FIGS. 8A and 8B, thus, one may insert a free end of at least one wire through the opening formed in the insulator; one would need a free end of the wire if the frangible sections are removed to define an opening, or several openings, surrounded by the remainder of the insulator insert material that is not removed. However, if wire supports 806 are removed and form an open ended cavity, such as a slot, that is not completely surrounded by the insulator insert material, once can simply lay the uncut wire (no free end required) into the slot formed in the insulator. While wire supports 806 are shown as a concave or semi-circle construction, they are not so limited in shape and may be various shapes such as, but not limited to, flat, hour-glass, angular, polygonal, circular, etc.

FIGS. 8A and 8B show an alternative embodiment of insulator insert with supports 800 wherein stand-off ridges 802 are formed on wire support ridges 804 as well as removable wire supports 806. Removable wire supports 806 serve to provide strength and rigidity to insulator insert with supports 800, acting like support arches or ribs to strengthen the structure of the insulator insert with supports 800, while also providing support to wiring or cabling introduced through openings 808 once shaped frangible sections 810 have been removed. Permanent wire support ridges 812 may also be incorporated into this, or other embodiments of the current disclosure, and would remain as part of the insulator during use regardless if all frangible sections are removed. Stand-off ridges 802 push against cap 101 offset ridge and secures the insulator tightly in support arms 102. Here, too, wire supports 806 may be removed to lay uncut wire/wiring into an insulator insert. It should be noted that FIGS. 8A and 8B show a further embodiment comprising of insulator 800. In this embodiment, no upper insulator portion is required to engage a lower portion. Instead, insulator 800 forms a single piece unit 801, which may be made from the materials specified supra. In this embodiment, stand-off ridges 802 contact a weatherhead cap 101 offset ridge or other structure to secure a wire or wiring within insulator 800 without requiring use of an upper portion. Here, to secure new wiring with a free end available, one might simply remove frangible sections at opening location 803 and 805 to form openings defined within the insulator insert with supports 800 single piece unit, or remove frangible sections at locations 807 and 809 to form slots for wiring that lacks a free end for installation. While shaped frangible sections 810 are shown as a flat rounded column, they are not so limited in shape and may be various shapes, including both two dimensional and three dimensional construction, such as, elongated cubes or elongated blocks, flat polygons, three dimensional polygons, hour-glass, angular, circular, etc., all of which may be two dimensional or three dimensional. Further, frangible sections 810 do not have to be the same shape and various shaped frangible sections 810 may be included in the same insulator. In sum, insert with supports 800 does not have an upper portion to install. After the installer lays the wire in the insulator, then the weatherhead cap may be installed. There is no need for the upper portion and the further embodiment may be used with a plastic cap or a cap that has a wire protect, not shown, built into same.

The current disclosure allows an installer to install wires without having the end of the wire being located near the service entrance head. That is, installation into a building or service with already installed cabling, wiring, phone lines, etc., wherein the end of the said cable, wire, line is in use at some other location and cannot be drawn through a prior art insulator as no end of the wire, cable, line is free and capable of being moved. The current disclosure, via use of frangible sections, openings, and support ridges, allows the insulator of the current disclosure to accept wire by simply having the wire reside in the opening defined in the insulator once a frangible section is removed from the insulator. The existing wire then simply lays in the formed opening and the top of upper section of the insulator engages with the lower section to secure the wiring/cabling/lines within the insulator body. This does away with the current problem of requiring that existing wiring be cut in order to reinstall an insulator or replace a weather cap, a time intensive process that requires the cooperation of the installer with the utility/company responsible for the wiring/cabling/lines.

As FIG. 9 shows, the current disclosure also includes a method for replacing a damaged or broken weather head 900. At step 902, remove existing weather head cap. At 904, inspect existing insulator. At 906, if the insulator is damaged, break away/remove existing insulator from around wiring/cabling/lines. At 908, remove existing weather head base and support arms from around conduit and wiring/cabling/lines. At 910, install new weather head collar around conduit and wiring/cabling/lines. At 912, install current disclosure insulator into weather head support arms. At 914, remove frangible sections from insulator body to form openings. At 916, place wiring/cabling/lines in openings formed in insulator. At 918, install insulator upper portion into insulator lower portion. At 920, reinstall the existing weather head cap or a new weather head cap.

The method illustrated by FIG. 9 may include a method for installing an improved insulator insert. The method may include exposing, such as removing a covering or simply engaging with a previous insulator, a previously installed insulator and wiring or cabling or lines secured by the previous insulator, removing the previous insulator from around the wiring, removing at least one frangible section from an insulator body of a new insulator to form at least one opening in the insulator body, placing at least one wire in the opening formed in the insulator body, securing the at least one wire within the new insulator by joining an upper insulator section to a lower insulator section to secure the wiring within the opening.

Further, the method may include removing an existing weather head cap to reveal the previous insulator and the associated parts of same such as removing a weather head base from conduit surrounding the wiring and installing a new weather head collar around the conduit. The method may include placing the new insulator into weather head support arms formed by the weather head collar and installing a new weather head cap or the existing weather head cap over the new insulator. To help secure the insulator in the weather head collar, the insulator upper portion does not move with respect to the insulator lower portion when joined. Again, the method may include joining an upper insulator section to a lower insulator section occurs with at least one support arm formed on the insulator upper portion engaging with an interior wall of the insulator lower portion. As discussed herein, the insulator may possess multiple frangible sections at various locations defined within the insulator body. The method may include removing at least one frangible section from at least a first frangible surface and a second frangible surface defined within an upper surface of the lower insulator section to reveal at least one opening in the first frangible surface and the second frangible surface. The method can include removing at least one frangible section from a third frangible surface defined in the upper surface of the lower insulator section. Installation may also include removing a frangible section to reveal the opening as well as at least one removable wire support as well as removing at least one removable wire support from the new insulator. The upper portion will move as a unit with the lower portion when both are joined. Further, the upper portion may have support arm 110, but can function without these as well.

Figure 10:
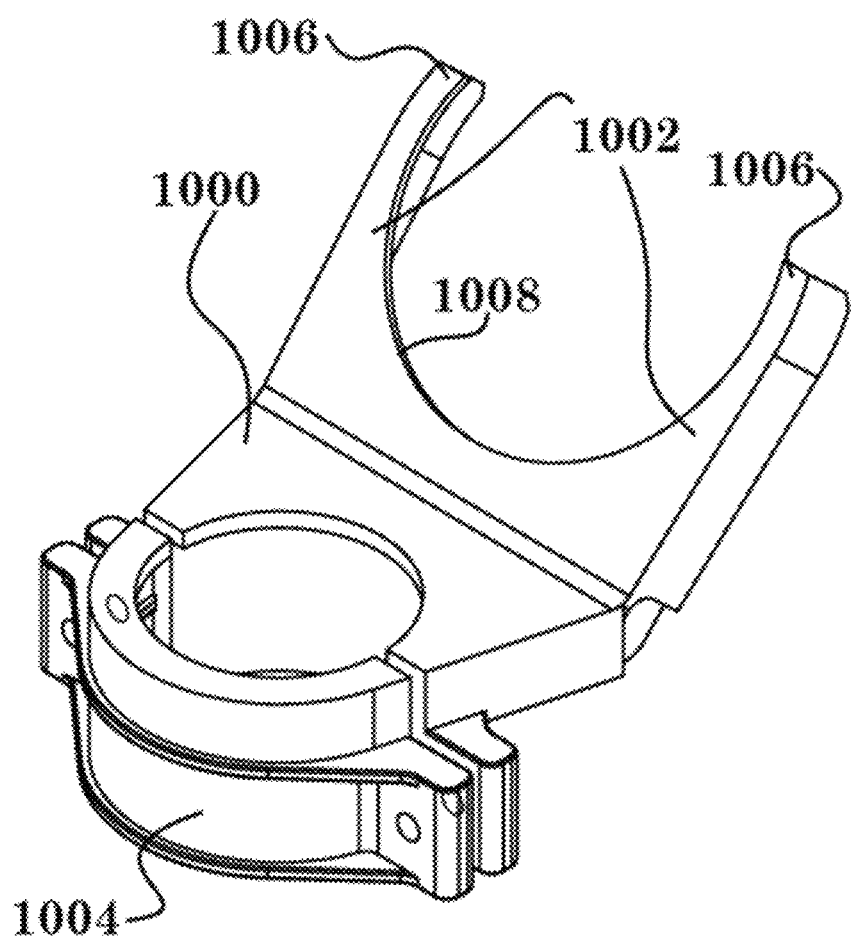
FIG. 10 shows a weather head base without a weather head cap or insulator in place.

FIG. 10 shows a weather head base 1000 without weather head cap 101 or insulator 100 in place. FIG. 10 illustrates weather head support arms 1002 and weather head collar 1004. Also, insulator lower portion engagement face 152 may engage with support arm ends 1006 to hold insulator 100 into position, as well as to keep insulator 100 from rotating inside weather head interior ring 1008.

All patents, patent applications, published applications, and publications, databases, websites and other published materials referred to throughout the entire disclosure herein, unless noted otherwise, are incorporated herein by reference in their entirety.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A disc insulator for a service weatherhead comprising:
   a generally planer surface;
   a ring wall upwardly extending from said surface over at least the bottom half of the periphery of said surface, said ring wall having a radially outwardly extending lip adapted for support by the weatherhead;
   service supports extending upwardly from said surface including
   (i) plural spaced-apart longitudinal dividers connected to each other and said ring wall;
   (ii) at least one service support ridge connecting said dividers to each other and said dividers to said ring wall,
   said surface having plural frangible areas between said dividers and between said dividers and said ring wall, the selective removal of said frangible areas creating an open space in said surface through which the service may pass,
   each of said open areas extending from one of said at least one ridge to the periphery of said insert so that a portion of the service may be positioned in one of said open spaces from the top of the insulator.

2. The insulator of claim 1 wherein said ring wall is substantially continuous over the length thereof.

3. The insulator of claim 1 wherein said lip is substantially continuous with said ring wall.

4. The insulator of claim 1 including a surface configured to prevent the rotation of the insulator within the weatherhead.

5. The insulator of claim 1 wherein one of said at least one service support ridge is selectively removable.

6. The insulator of claim 1
   wherein said ring wall is substantially continuous over the length thereof;
   wherein said lip is substantially continuous with said ring wall; and
   including a surface configured to prevent the rotation of the insulator within the weatherhead.

7. The insulator of claim 6 wherein one of said at least one service support ridge is selectively removable.

8. A method of inserting a disc insulator into an installed weatherhead attached to a service conduit, the weatherhead having a weather cap and a support for the disc insulator, comprising the steps of:
   a. opening the weather cap of the weatherhead;
   b. removing the disc insulator to be replaced;
   c. providing a disc insulator having:
      a generally planer surface;
      a ring wall upwardly extending from said surface over at least the bottom half of the periphery of said surface, said ring wall having a radially outwardly extending lip adapted for support by the weatherhead;
      service supports extending upwardly from said surface including
      (i) plural spaced-apart longitudinal dividers connected to each other and said ring wall;
      (ii) at least one service support ridge connecting said dividers to each other and said dividers to said ring wall,
      said surface having plural frangible areas between said dividers and between said dividers and said ring wall, the selective removal of said frangible areas creating an open space in said surface through which the service may pass,
      each of said open areas extending from one of said at least one ridge to the periphery of said insert so that a portion of the service may be positioned in one of said open spaces from the top of the insulator;
   d. removing at least one frangible area from the replacement insulator;
   e. positioning the replacement insulator on the insulator support;
   f. positioning the service in the open spaces through the top of the replacement insulator; and
   g. replacing the weather cap.

9. A removable, one-piece disc insulator for a two-piece weatherhead having a collar attached to a service cable conduit (i) to provide support for a weather cap and (ii) to provide support for a removable one-piece disc insulator that separates one portion of the service cable from a second portion thereof as the service cable passes through the weatherhead, said insulator support including (a) spaced-apart arms to support said insulator, and (b) a second generally upwardly-facing shoulder generally orthogonal to said first shoulder;

said removable disc insulator including (a) a central area, (b) a peripheral area, and (c) a plurality of knockouts defining (i) at least one open area in said central area through which a portion of the service may pass and (ii) a passageway from said radial periphery in an upper portion of said insulator to said knockouts so that a portion of the service cable may pass downwardly through said passageway to said open area without the necessity for passing the end of said portion therethrough the open area; and said removable disc insulator being configured to mate with said insulator support so as to prevent rotative movement of said insulator relative to said insulator support in response to the downwardly insertion of a portion of the service cable into said passageway from the peripheral edge of said insulator.

10. A disc insulator for use in a weatherhead having a collar attached to a service cable conduit (i) to provide support for a weather cap and (ii) to provide support for a removable one-piece disc insulator with plural open spaces through which the service cable passes, the improvement wherein each of said plural open spaces extends to the upper periphery of the disc insulator so that the service cable may pass through said open spaces without the necessity for passing the end of said portion through said open spaces.

11. A one-piece disc insulator that separates one portion of a service cable from a second portion thereof interiorly of a weatherhead, said disc insulator being insertable into the interior of, and being separable from, the weatherhead, said disc insulator having (a) a periphery, (b) a central area and (c) a plurality of knockouts defining (i) at least one open area in said central area through which a portion of the service may pass and (ii) a passageway from said periphery in an upper portion of said disc insulator to said open area, so that a portion of the service cable may pass downwardly through said passageway to said open area without the necessity for passing the end of said portion through the open area.

* * * * *